US007162508B2

(12) United States Patent
Messina (10) Patent No.: US 7,162,508 B2
(45) Date of Patent: Jan. 9, 2007

(54) SYSTEMS, METHODS, AND SOFTWARE FOR BUILDING INTELLIGENT ON-LINE COMMUNITIES

(75) Inventor: Christopher P. Messina, Cambridge, MA (US)

(73) Assignee: Bodyl, Inc., Cambridge, MA (US)

( * ) Notice: Subject to any disclaimer, the term of this patent is extended or adjusted under 35 U.S.C. 154(b) by 351 days.

(21) Appl. No.: 10/103,536

(22) Filed: Mar. 20, 2002

(65) Prior Publication Data

US 2003/0061215 A1     Mar. 27, 2003

Related U.S. Application Data

(63) Continuation of application No. PCT/US00/25886, filed on Sep. 20, 2000.

(60) Provisional application No. 60/154,885, filed on Sep. 20, 1999.

(51) Int. Cl.
*G06F 15/16* (2006.01)
(52) U.S. Cl. .......................... 709/200; 709/217; 707/9
(58) Field of Classification Search .................. 705/2, 705/3, 9; 709/718–227; 707/1–10
See application file for complete search history.

(56) References Cited

U.S. PATENT DOCUMENTS

| | | | |
|---|---|---|---|
| 4,190,057 A | 2/1980 | Hill et al. | 128/675 |
| 5,487,756 A | 1/1996 | Kallesoe et al. | 607/118 |
| 5,517,405 A | 5/1996 | McAndrew et al. | 364/401 |
| 5,623,660 A | 4/1997 | Josephson | 395/609 |
| 5,708,825 A | 1/1998 | Sotomayor | 395/762 |
| 5,864,874 A * | 1/1999 | Shapiro | 707/201 |
| 5,890,149 A | 3/1999 | Schmonsees | 707/3 |
| 6,064,978 A * | 5/2000 | Gardner et al. | 705/10 |
| 6,073,105 A | 6/2000 | Sutcliffe et al. | 705/1 |
| 6,128,602 A | 10/2000 | Northington et al. | 705/35 |

FOREIGN PATENT DOCUMENTS

| | | |
|---|---|---|
| EP | 0303930 A2 | 2/1989 |
| EP | 0784263 A1 | 7/1997 |
| WO | WO-9841943 A1 | 9/1998 |
| WO | WO-01/22292 | 3/2001 |
| WO | WO-02097678 A1 | 12/2002 |

OTHER PUBLICATIONS

"Integrated Measurement Systems Builds an Intranet to Speed Information Sharing", *Integrated Measurement Systems, Inc.*, http://www.ims.com/html_best_practices_article.html, (2003), 9 pages.
Cabral, J.E., et al., "Multimedia Systems for Telemedicine and their Communications Requirements", *IEEE Communications Magazine, vol. 34 (7)*, IEEE Service Center, Piscataway, N.J., US, (Jul. 1, 1996).

* cited by examiner

*Primary Examiner*—Moustafa M. Meky
(74) *Attorney, Agent, or Firm*—Schwegman, Lundberg, Woessner & Kluth, P.A.

(57) ABSTRACT

In recent years, computers have become everyday communication tools, fast approaching the commonness of telephones and televisions. Driving this approach is the ever-expanding Internet, which enables users not only to communicate with each other, but also to search for information of particular interest. Two problems for Internet users are the time and effort necessary to find information they want and to connect with other users who share interest in similar information. Accordingly, the present inventor devised systems, methods, and related software that spurs growth of databases and/or fosters connections between users of those databases. One exemplary method entails receiving user contributions to a theme-oriented database, such as a health-information website and granting users access rights to the database based on quantity, quality, and/or relevance of their contributions. The exemplary method also shares contact information with users making similar queries of the database, ultimately promoting development of intelligent on-line communities.

12 Claims, 6 Drawing Sheets

| | | | |
|---|---|---|---|
| ADD/ADHD | Cystic Fibrosis | Impotence | Pneumonia |
| AIDS/HIV | Dental Problems | Incontinence | Polio |
| Alcoholism | Depression | Irritable Bowel Syndrome | Pressure Ulcers |
| Allergies | Diabetes | Joint Replacement | Prostate Cancer |
| Alzheimer's Disease | Diphtheria | Kidney Stones | Prostate Enlargement |
| Amytropic Lateral Sclerosis (ALS) | Diverticulitis | Knee Problems | Psoriasis |
| Angina | Eating Disorders | Liver Cirrhosis | Raynaud's Phenomenon |
| Anxiety Disorders | Encephalitis | Lupus | Rubella |
| Aphasia | Endometriosis | Lyme Disease | Schizophrenia |
| Arterial Embolism | Epilepsy | Macular Degeneration | Sciatica |
| Arthritis | Fibromyalgia | Manic Depression/Bipolar Disorders | Sexually Transmitted Diseases |
| Asthma | Flu | Measles | Shock |
| Ataxia-Telangiectasia (A-T) | Focal Segmentation Glomerulosclerosis | Menopause | Skin Care and Aging |
| Autism | Fracture | Migraines | Sleep Disorders |
| Back Pain | Frostbite | Multiple Sclerosis | Smoking |
| Bell's Palsy | Gallstones | Mumps | Stroke |
| Breast Cancer | Gas | Muscular Dystrophy | Stuttering |
| Cancer | Glaucoma | Myasthenia Gravis | Sudden Cardiac Arrest |
| Carpal Tunnel | Headaches | Narcolepsy | Tetanus (Lockjaw) |
| Cataracts | Heart Disease | Obesity | Thyroid Disease/Nodules |
| Cerebral Palsy | Heartburn/GERD | Osteoporosis | Tuberculosis |
| Chicken Pox | Hemorrhoids | Other | Ulcers |
| Chronic Fatigue Syndrome | Hepatitis, Acute | Ovarian Cancer | Urinary Tract Infections |
| Chronic Pain | Hepatitis, Chronic | Ovarian Cysts | Vaginitis |
| Constipation | High Blood Pressure | Parkinson's Disease | Vitiligo |
| Crohn's Disease | Huntington's Disease | Pertussis (Whooping Cough) | Yeast Infection |

SYSTEMS, METHODS, AND SOFTWARE FOR BUILDING INTELLIGENT ON-LINE COMMUNITIES

CROSS-REFERENCE TO RELATED APPLICATIONS

The present application is a continuation of International Application No. PCT/US00/25886 filed Sep. 20, 2000 and published in English on Mar. 29, 2001 as Publication No. WO 01/22292, which is a continuation of U.S. Provisional Application No. 60/154,885 filed on Sep. 20, 1999. Both applications are incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyright whatsoever. The following notice applies to this document: Copyright © 1999, Body1, Inc. (formerly known as MedBeat, Inc.)

BACKGROUND

Computers have enjoyed, in recent years, an enormous growth in utility. Early computers allowed users to perform tasks such as word processing and bookkeeping. Today, however, computers have become everyday communication tools, fast approaching the commonness of telephones and televisions.

Much of this growth in the communications realm stems from the fantastic, compounded growth of computer networks, such as the much-heralded Internet—a worldwide network of computers interconnected through public and private wiring and telephone systems. The Internet functions as a planetary communications system, enabling users to communicate with each other, to transmit data to each other, and to search for data of particular interest.

One problem stemming from the rapid growth of the Internet concerns the time and effort often necessary to find data of particular interest. There are numerous publicly accessible search engines that continually work to index the data on the Internet and thus facilitate locating it. However, with the vast amounts of available data, these search engines often answer user queries with large amounts of irrelevant data, leaving users to spend significant time and effort sifting through it for the data, the knowledge, they actually want. Although combination search engines have been developed to allow users to simultaneously use two or more search engines, in many instances these have only presented users with even more data to sift, thus compounding the data-finding problem.

Another related problem is that the planetary scope of the Internet makes it difficult for users to find and communicate with other users who share interests in similar kinds of information. Websites, chat rooms, and forums devoted to particular topics, such as health, have emerged in recent years. However, the information shared through these websites, chat rooms, and forums is too often sparse and of poor quality, since many participants behave as spectators and do not actively contribute information. Moreover, direct competition between the websites, chat rooms, and discussion forums for users generally leads to smaller, fragmented communities of users, thwarting development of larger aggregate communities.

Accordingly, there is a need not only to reduce the time necessary to find particular types of data on the Internet, but also to facilitate development of communities of active users around specific topics and conversion of information into real knowledge.

SUMMARY

To address this and other problems, the present inventor devised systems, methods, and related software for encouraging and managing growth of databases, particularly theme-oriented databases, such as health-information databases. One exemplary method entails establishing a theme-oriented database and granting users access rights to the database based on their contributions or submissions to the database. One specific embodiment scores the contributions based on quantity, quality, and/or relevance, granting access rights based on the scores. Other embodiments record the queries of users of the database and facilitate communications between users having similar queries as well as users making similar contributions.

Notably, various embodiments of the invention facilitate the incorporation of user experiential data into the context of thematic databases that make it relevant and useful, in essence converting it to knowledge.

DETAILED DESCRIPTION OF PREFERRED EMBODIMENTS

The following detailed description, which references and incorporates the Figures, describes and illustrates one or more specific embodiments of the invention. These embodiments, offered not to limit but only to exemplify and teach, are shown and described in sufficient detail to enable those skilled in the art to implement or practice the invention. Thus, where appropriate to avoid obscuring the invention, the description may omit certain information known to those of skill in the art.

Definitions

This description includes many terms with meanings derived from their usage in the art or from their use within the context of the description. As a further aid, the following exemplary definitions are presented.

The term "document" refers to any logical collection or arrangement of machine-readable data having a filename.

The term "database" includes any logical collection or arrangement of machine-readable documents.

The term "hyperlink" or "link" includes any token conforming literally or functionally to any past, present, or future Uniform Resource Locator (URL) standard. It also includes any token including information identifying a specific computer system or networked device.

Exemplary System Architecture

Figure 1:
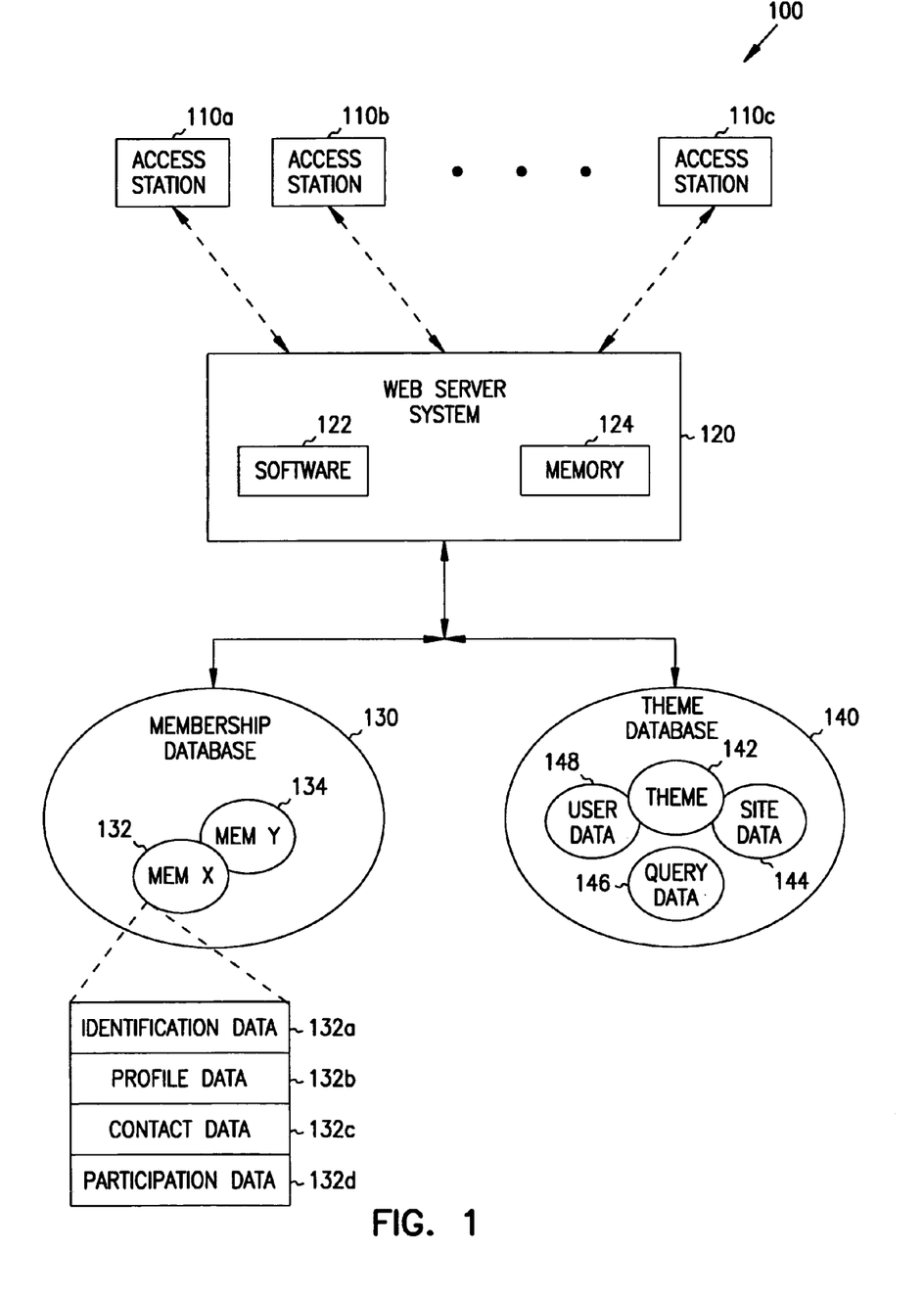
FIG. 1 is a block diagram of an exemplary theme-oriented database-management-and-community-building system 100 incorporating teachings of the present invention.

FIG. 1 shows an exemplary theme-oriented database-management-and-community-building system 100. The broken lines in the figure indicate that various components of the system are interconnected permanently or temporarily via a wired or wireless wide-area-network, such as the Internet, or a secure wired or wireless local-area networks, such as a corporate Intranet. The exemplary embodiment uses Secure Transaction Technology to ensure secure connections. System 100 includes user access stations 110, a web server system 120, a membership database 130, and a theme-oriented database 140.

More particularly, user access stations 110 includes one or more access stations, of which stations 110a, 110b, and 110c are representative. The term "access station," as used herein, encompasses browser-equipped personal computers, network appliances, personal digital assistants, telephones, cell phones, web phones, televisions, web television, etc. Thus, the present invention is not limited to any particular class or form of access device.

Selectively coupled to access stations 110 is web server system 120. Web server system 120 includes one or more software modules 122 and one or more memory modules 124 which cooperate to serve data to and from databases 130 and 140 and the access stations 100, and to define and generate related webpages and graphical-user interfaces. (See, for example, exemplary home pages 300 and 500 in FIGS. 3 and 5, respectively.)

Membership database 130 includes information regarding members or potential members (users) of system 100. Figure shows this information as representative records 132 and 134, which are substantially identical in structure. In the exemplary embodiment, record 132 includes member-identification data 132a, member-profile data 132b, member-contact or -linking data 132c, and member-participation data 132d. Member-identification data 132a includes data for identifying or authenticating the identity of a user. Member-profile data 132b includes data describing the professional biographies and credentials of the member. Member-contact data 132c includes data, such as one or more postal addresses, telephone numbers, e-mail addresses, or URLs for facilitating contact or communications with the associated user. And, member-system-participation data 132d includes quantitative and qualitative information regarding actual and permitted use of the system by each user. For instance, the exemplary embodiment maintains one or more access scores for each member, indicating levels of access to respective portions of theme-oriented database 140.

Theme-oriented database 140 includes theme data 142, site data 144, query data 146, and user data 146. Theme data 142 includes one or more keywords, terms, concept, or website address which define one or more aspects of the thematic or topical content of database 140. Exemplary themes or topics includes general healthcare and wellness information for humans or other animals, such as dogs, cats, or fish; specific healthcare information for various parts of the human body, such as joints (knees, hips, elbows, spine, etc.) or organs (heart, lungs, stomach, kidney, liver, eyes, ears, skin, etc.); specific medical conditions, such as allergies (food, plant, etc.), cancer, arthritis, obesity, mental illness; auto-immune deficiency (HIV). Other exemplary topics include technology breakthroughs, health-technology breakthroughs, children, cooking, sports, entertainment, celebrities, politics, law, restaurants, consumer products, motion pictures, videos, music recordings, corporations, government officials, criminal activity, schools, science, wines, beers, foods, professional service providers (lawyers, doctors, contractors, artisans, etc.) colleges, alumni of educational institutions, genealogy, gossip, or sex. One exemplary health-oriented database includes user-generated health content, medical-journal content, and an archive of health-oriented feature stories. Thus, the present invention is not limited to any particular theme or class of themes.

Site data 144 includes feature articles, journal articles and other content added to database 144 manually by its creators, sponsors, or other parties governing or maintaining the database or automatically by the system itself. Query data146 includes a listing of one or more queries (or query summaries) made by registered users or members of the community, against the database, with each query associated with one or more portions of the membership data for its submitting member. User data 146 includes user contributions to the database, with each contribution logically associated with or appended to one or more portions of the membership data for its submitting member.

In its exemplary operation, system 100 generally enables users not only to access, that is, query theme-oriented data in database 110, but also to contribute data to the database. Users earn access rights to various portions of the database. Access rights are granted based on quality and/or relevance of database contributions and referrals of new members to the system.

Exemplary System Operation

Figure 2:
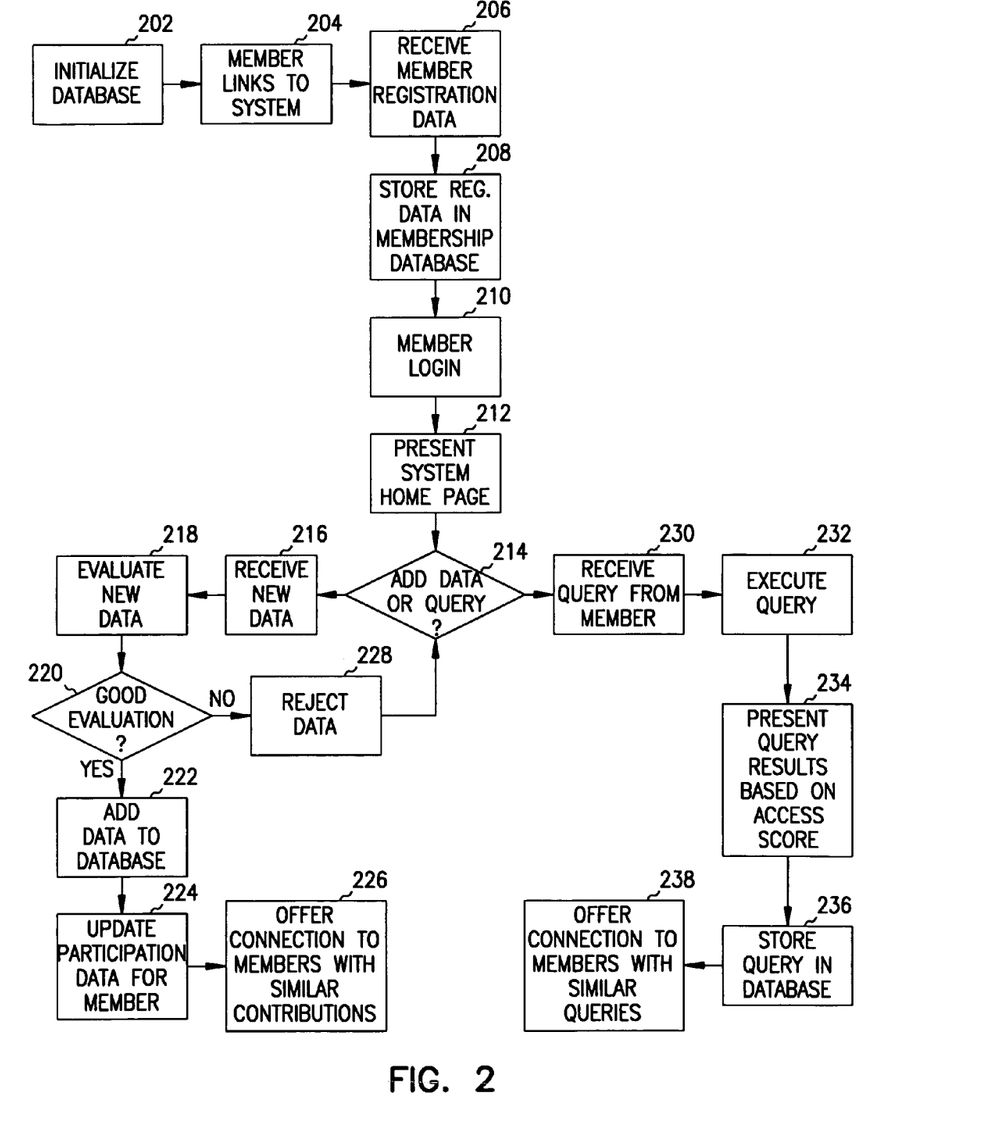
FIG. 2 is a flow chart illustrating exemplary operation of system 100 in FIG. 1.

More specifically, FIG. 2, which shows an exemplary flowchart 200, illustrates an exemplary method of operating system 100. Flow chart 200 includes blocks 202–230, which are executed serially in the exemplary embodiment. However, other embodiments of the invention may change the order of execution and/or execute two or more blocks in parallel using multiple processors or a single processor organized as two or more virtual machines or subprocessors. Moreover, still other embodiments implement the blocks as two or more specific interconnected hardware modules with related control and data signals communicated between and through the modules. Thus, the exemplary process flow is applicable to software, firmware, and hardware implementations.

The exemplary method begins at block 202, with automatically or manually establishing an initial version of theme-oriented database 140. To this end, the exemplary method entails determining a theme or topic and conducting one or more Internet searches to identify a set of one or more candidate members. Exemplary candidate members include existing websites or portions of websites related to the theme and persons or firms with expertise or indicated interest in the theme. The publishers of identified publications and websites are then invited to register as members of the system. An exemplary electronic invitation includes an explanation of the system and a URL to the system. Execution of the exemplary method then proceeds to block 204.

In block 204, one or more of the candidate members establish a communications link with the system through webserver 120. This entails each of the candidate members using an access station, such as access station 110, to invoke the URL to the system. For example, the user at access station 110 would invoke "www.domain-name.com" to connect her computer system (or other network appliance) to webserver system 120. After establishing the link to webserver 120 execution proceeds to block 204.

Block 206 entails receiving registration information from the candidate member. The registration information includes member-identification data, member-profile data, member-contact or -linking data, and member-system-participation data. Member-identification data includes data for identifying or authenticating the identity of a user, such as a username and password. Member-profile information includes professional biographical information, such as present employment, professional achievements, educational or other promotional type material indicating or suggesting the authority or credibility of the registering member in the topic. Member-contact data includes data, such as one or more postal addresses, telephone numbers, e-mail addresses, or URLs for facilitating contact or communications with the associated user. Member-system-participation data includes an access score that governs the level of access that the associated member has over theme-oriented database 140. The exemplary system determines an initial access score based on whether the user was referred by an existing member, or whether the user was given a special invitation based on his or her expertise in the theme. If an existing member referred the user, the access score for the existing member is increased upon registration of the new user. After all registration information has been received for a particular member, execution proceeds to block 208

In block 208, the system records the received registration information in membership database 130. Although the exemplary embodiment maintains membership database 130 separate from theme-oriented database 140 for heightened security, some embodiments combine the databases. With recording of the registration information, the exemplary method advances to block 210.

Block 210 entails the new member logging into the system to access theme-oriented database 140. Specifically, this entails the new (or an existing) member manually or automatically entering a username and password. (Existing members bypass blocks 202-208 to reach block 210) The username and password are then verified against those in membership database 130. Affirmative verification advances the exemplary method to block 212.

In block 212, the system presents the member a home page for theme-oriented database 140. (See FIG. 3 and related description of exemplary home page.) From the home page, the member decides to query database 140 or to contribute data to database 140 as indicated by decision block 214.

A member decision to make a contribution to the database branches execution to block 216, which entails receiving a contribution from the member. Execution then continues to block 218.

In block 218, the system evaluates or scores the contribution based on its quality and/or relevance to the theme-oriented content of database 140. To evaluate the contribution, the exemplary embodiment converts the contribution to a natural-language query and executes this query against all or part of database 140. The natural-language searching algorithm produces quantitative measures of the relevance of the contribution. Other embodiments produce the measures using inverse-document-frequencies factors that favor rare terms and/or frequency factors which favor terms that in the document to be scored. In some embodiments, the contribution is summarized using specialized software, such as that described in U.S. Pat. No. 5,708,825, entitled Automatic Summary Page Creation and Hyperlink Generation, which is incorporated herein by reference. Other embodiments score the contribution based on additional factors, including for example, length (number of words), number of citations to leading journals, inclusion of hyperlinks to predetermined cites (such as sponsors of the system) and/or grammar. Still other embodiments score the contributions manually using an editorial board of experts in the theme.

Execution then continues at decision block 220, where the system determines if the evaluation was good or not. That is, is the contribution of sufficient relevance and quality to be added to database 140. If the contribution has a good evaluation, based for example on its score exceeding some threshold value, the system proceeds to block 222.

In block 222, the system adds the contribution to database 140. In the exemplary embodiment, this entails appending the username along with one or more portions of the member's member-profile information and/or member-contact information to the beginning and/or end of the contribution. (Some embodiments use a side by side presentation approach for the contribution and its attribution.) Thus, other members accessing this information can identify its contributing member and assess credibility and authority of the contribution. Moreover, if a contributing member has elected to allow publication of its contact information, such as its e-mail address, future users of the information may establish communications with the contributor. Publication of a hyperlink or URL associated with the contributor will offer opportunities for reciprocal web traffic from webserver 120 to a webserver associated with the contributing member, creating an incentive for further contributions to the theme-oriented database.

In block 224, after adding the contribution to database 140, the system updates the access score portion of the participation data for the member based on the score of the contribution. In the exemplary embodiment, this entails adding the score of the contribution to the initial or previous access score in membership database 130. However, other embodiments adopt other forms of update.

In block 226, the system offers the contributing member an opportunity to connect with one or more other members who have made similar contributions to database 140. In the exemplary embodiment, this entails defining a query based on the contribution and executing this query against the user data portion of database 140, more precisely user data 149. Based on the results of this query, the exemplary embodiment presents one or more usernames and related contact or biographical information for other members who have made similar contributions to the database, thereby facilitating communications between the contributing member and other contributing members.

On the other hand, if the contribution had a poor evaluation based on the threshold, execution proceeds to block 228 which outputs a message to the member indicating that the contribution was rejected. Some embodiments may offer an explanation for the rejection, and others refer the member to an alternate system with an appropriate theme for receiving the information. Still others reroute the contribution to the alternate system, automatically enrolling the member in the alternate system by transferring a copy of the associated membership information. After rejecting the data, execution returns to decision block 214, where the member can choose to add new data or to submit a query for database 140.

From block 214, a decision to query database 140 branches execution to block 230, which entails receiving a query from the member. Although the scope of the invention encompasses queries of any number of forms, the exemplary embodiment accepts queries as a textual string with boolean connectors or as a natural-language query. (Moreover, the exemplary embodiment permits the member to restrict the query to specific portions of theme-oriented database 140, such as to site data or user data.) Execution of the exemplary method then proceeds to block 232.

In block 232, the system executes the query against database 140. In the exemplary embodiment, this entails running the query against the entirety of database 140. However, some embodiments restrict the query to one or more portions of database 140.

In block 234, the system presents query results to webserver 120 for viewing by the member through an access station. The exemplary embodiment presents the query results based not only on the query and the contents of database 140, but also on the access score for the member. Thus, for example, a low access score may result in all or a portion of the results being withheld from the member. Some embodiments advise the member quantitatively regarding the withheld portion of the results. For example, the system presents a message that a certain percentage of the results is withheld. Other embodiments present citations for the portions being withheld to assist the member in determining the desirability of this withheld information. Variations of this approach may present the profile of the contributors of the withheld results.

In presenting the results to the requesting member, the exemplary system arranges or organizes the results based not only on relevance to the query presented but also on factors, such as the access rights of the respective contributors of data to the system. Thus, for example, data contributions from contributors that have accrued relatively high access rights are generally presented before data contributions from contributors with relatively lower access rights, assuming the contribution are of approximately equal relevance to the query. This presentation mechanism further encourages members, particularly those with related websites, to contribute content to the database.

Some embodiments present the results in a predetermined order based on the portions of the database that contain them. For example, one embodiment presents found data in the order of feature articles, user contributions, and journal articles, with the items in each category arranged based on relevance and/or access rights of respective contributors.

In block 236, the system stores the query and associated member-profile and/or member-contact information to the query portion of database 140. Once stored in database 140, the query is searched like any other content within the database. When query results include one or more queries the queries are presented along with the usernames associated with the queries.

In block 238, after storing the query, the system offers the contributing member an opportunity to connect with one or more other members who have made similar queries of database 140. In the exemplary embodiment, this entails defining a query based on the query and executing this query against the query data portion of database 140, more precisely user data 146. Based on the results of this query, the exemplary embodiment presents one or more usernames and related contact or biographical information for other members who have made similar contributions to the database, thereby facilitating communications between the member and other members with similar queries. Of course, the member then has the option to contact one or more of the other members. Other embodiments also presents the member options to connect with members who have published information relating to the query or to allow other members with similar questions to contact her in the future.

Exemplary Home Pages

Figure 3:
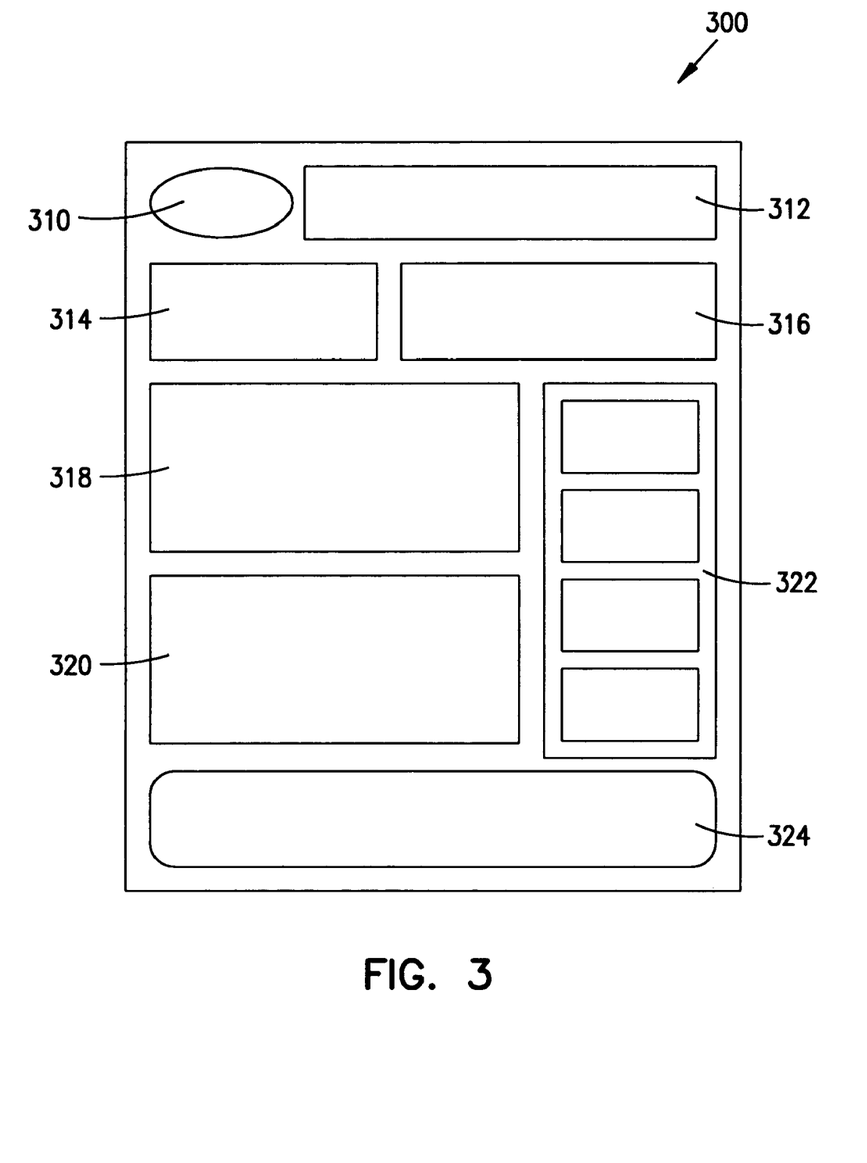
FIG. 3 is a block diagram of an exemplary home page 300 for use in system 100.

FIG. 3 shows an exemplary home (or start) page 300 generated by webserver system 120 for display in response to authorized access to health-oriented version of database 140. Home page 300 includes banner advertising regions 310 and 312, a site logo region 314, information region 316, a search region 318, a feature-content region 320, a sponsorship or partnership region 322, and link region 324.

Figure 4:
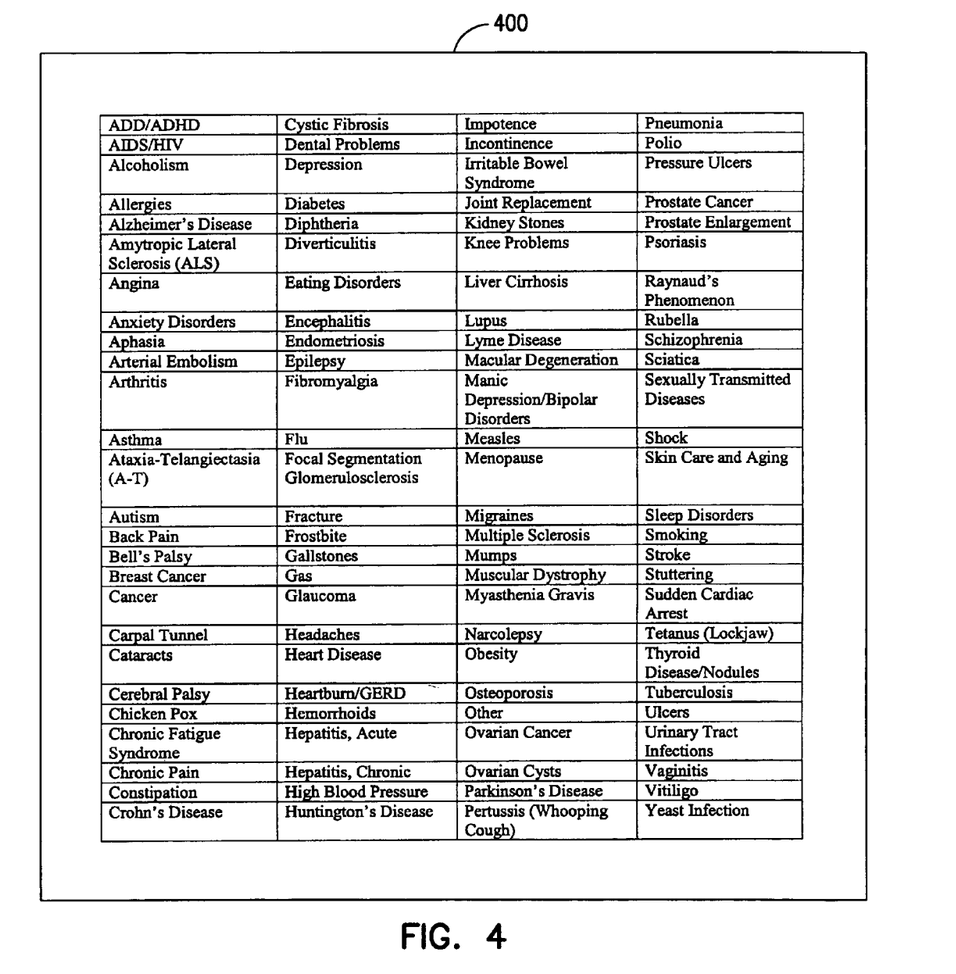
FIG. 4 is a diagram of a list of categories linked to home page 300.

Information region 316 includes a link 316*a* to a list 120 of links to categories of medical conditions and health areas. This list of links is shown in FIG. 4 as table 400. Each category link takes the user to archived content, user-contributed content, relevant site-generated top-ten lists, and links or phone number for groups, hospitals and doctors that specialize in the condition. (Some embodiments allow users to restrict the information based on geography.) Information region 316 also includes a donor or contribution subregion 316*b* where users have the opportunity to publish useful health and medical information, and a site top-ten region 316*c* where users cast votes on their favorite products, services, and advice.

Search region 318 accepts entry of keyword or natural-language style queries. Submitted queries are executed against user-generated content, medical journal content, and site-created editorial content in database 140. In embodiments that associate, health-oriented database 140 with other theme-oriented databases, such as a knee database, a veins database, and a medical-technology database, search region 318 enables users to search across all or a subset of the related databases.

Feature-content region 320, in the exemplary embodiment, changes daily and includes health-related stories, of for example 600 words. This region presents users an opportunity to add comments and/or contribute information at the end of the story in a user subregion 320*a,* below the story. User subregion 320*a* includes prompts (not shown) urging users to submit story-relevant information about local support groups and hospitals in their areas.

Sponsorship or partnership region 322 includes links to one or more nationally-recognized e-commerce or pharmaceutical companies. Exemplary commerce partners include an on-line drugstore, a baby-and-children products store, an online book retailer, and a vitamins-nutraceutical store.

Link region 324 includes one or more links to other general health or medical sites. Exemplary sites include a site for first-aid information and government health sites.

Figure 5:
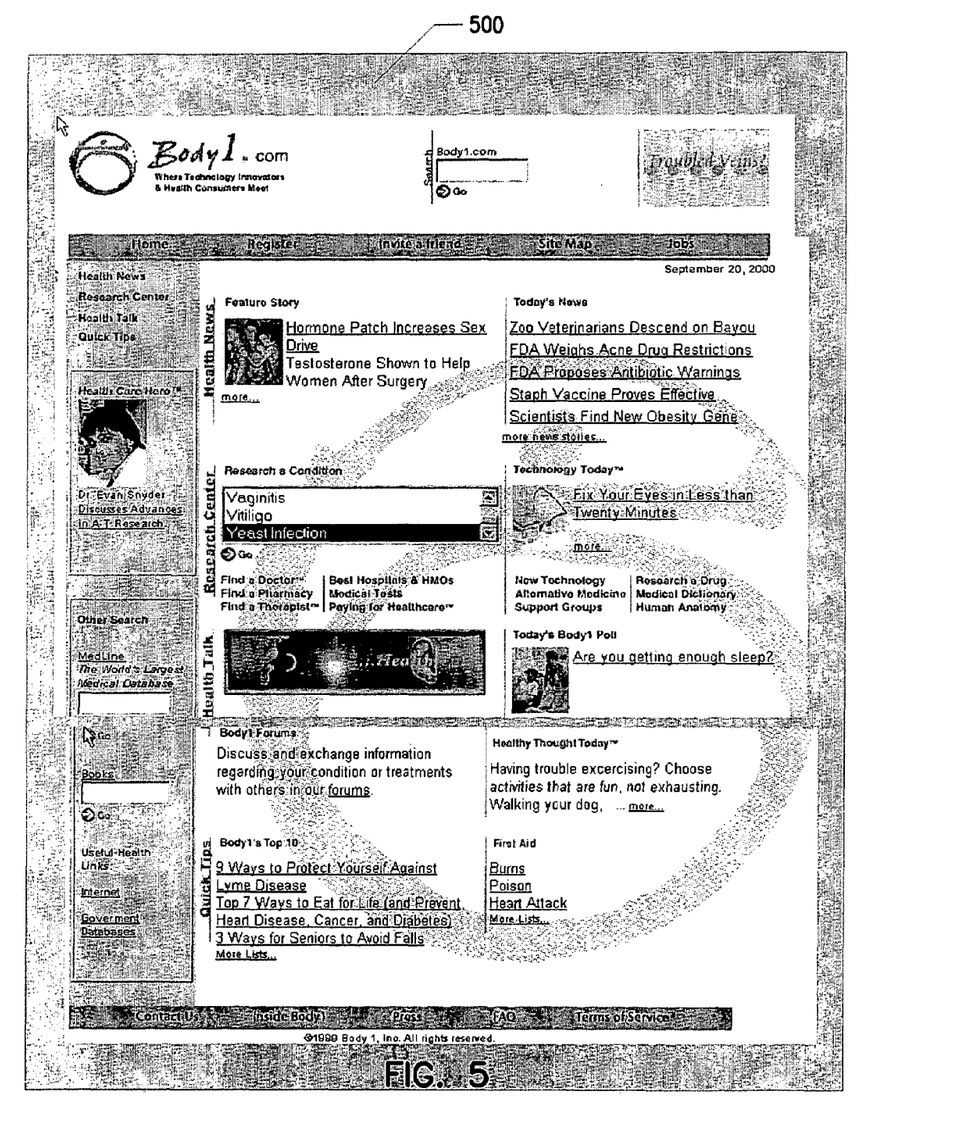
FIG. 5 is a facsimile of another exemplary home page 400 for use in system 100.

FIG. 5 shows another exemplary home page 500. Home page 500 includes many features analogous to those in home page 300.

Exemplary Medical-Information System

Figure 6:
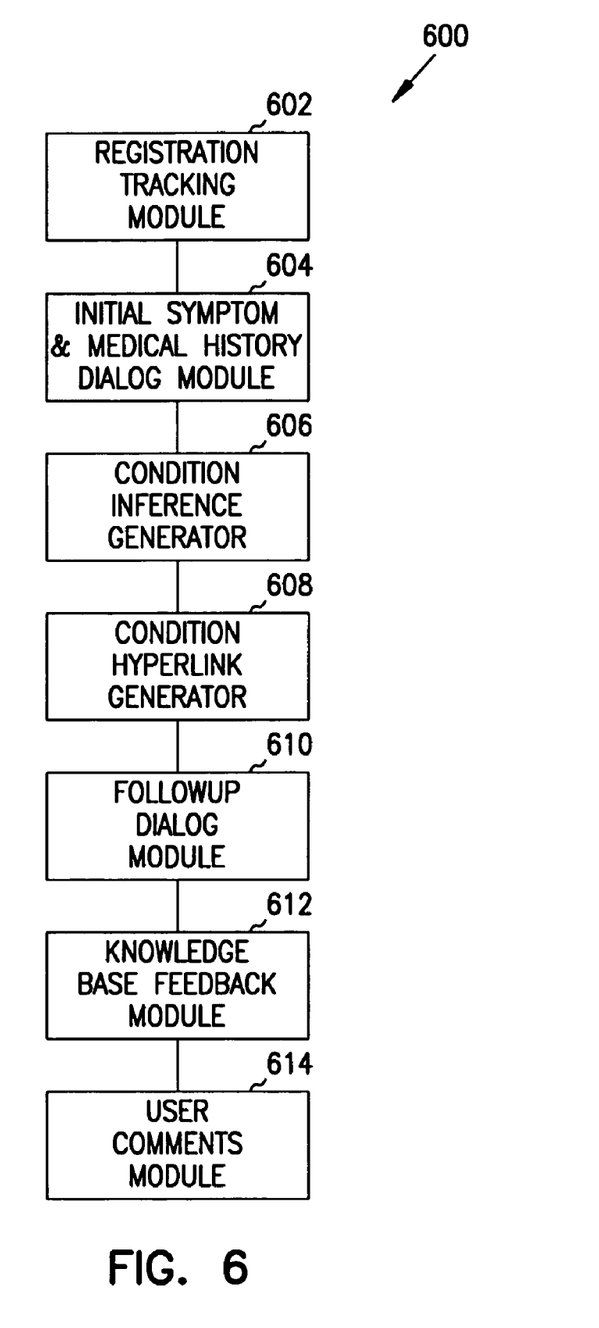
FIG. 6 is a block diagram of an exemplary intelligent medical information system which can be integrated into a medical- or health-oriented version of system 100.

FIG. 6 shows an exemplary medical-information system 600 which can be integrated into system 100 of FIG. 1, as software, hardware, or firmware modules. System 600 includes a user-registration-and-tracking module 602, an initial-symptom-and-medical-history-dialog module 604, a condition-inference engine 606, a condition-hyperlink generator 608, a followup-dialog module 610, a knowledge-base-feedback module 612, and a user-comments module 614.

User-registration-and-tracking module 602 receives user or member registration or membership information and assigns the username and password. Alternatively, the user can define her own username and password. Exemplary registration or membership information includes the gender and date of birth of the user. The registration information is stored in a database such as database 130 in system 100. The registration data is available for retrieval during subsequent user visits and for other operations of system 600, such as knowledge base enhancement.

Initial-symptom-and-medical-history-dialog module 604 assigns a case number, specific to the username as it begins receiving an initial description of symptoms through a natural-language interface. A parser (not shown) attempts to extract one or more symptoms from the initial description. The user is then asked to confirm the one or more parsed symptoms. If a symptom cannot be parsed, a form-based interface is presented to the user, with a prompt to select a symptom from a pick list. Pick lists are subdivided, based on symptom categories. Based on the one or more extracted symptoms, the user is lead through a series of yes-no dialogs to aid in determining one or more conditions that may be causing the symptom.

Condition-inference engine 606 receives the yes-no answers from initial-symptom module 604 and develops a list of one or more potential conditions, ranked by probability or frequency. In the exemplary embodiment, the condition-inference engine uses rules stored in a database, rather than hard-coded rules, to facilitate maintenance and automatic modification based on experience with users.

Condition-hyperlink generator 608 accepts output from the condition-inference engine, in the form of a list of medical conditions. For each condition, generator 608 produces a short description of the condition and an HTML page of hyperlinks appropriate to the condition, including articles about the condition, potential treatments, effectiveness of treatments, side effects of treatments, prognosis, survival rates, specialists, support groups.

Followup dialog module 610 asks the user questions based on the username and case number. Questions are also based on data from the initial symptoms dialog and results from the condition-inference engine. Exemplary questions include whether the user visited a doctor, and if so, what diagnosis was given. In the exemplary embodiment, the followup dialog module includes a natural-language interface. However, in other embodiments, the followup dialog module includes a dynamically generated HTML form, with appropriate use of pick lists, radio buttons, check boxes, and text-entry fields.

Knowledge-base feedback module 612 uses information gained in the followup dialog to enhance the knowledge base used in the condition-inference engine. In particular, diagnosis by doctors shall be used to enhance the probability ranking of conditions.

User-comment module 614 accepts comments from users about conditions, treatments, and side effects noted from followup dialog. These comments are extracted from the followup dialog, stored in a database, and made accessible to other users.

An exemplary operational scenario for system 600 proceeds as follows. A user logs into the system and registers as a first time user, filling out a form identifying her gender and date of birth. The system asks the users, "How can I help you today?" The user types, in natural language, "My wife and I are having trouble getting pregnant." The system replies, "I understand that you and your wife are having trouble conceiving. Is that correct?" The user replies, "Yes." The system asks, "Have you seen a doctor about your condition?" The user replies, "No." The system asks, "Have you been trying to get pregnant for more than one year?" Users says, "Yes," and the system "Did you suffer from mumps after the age of 12?" User says, "No," and system asks "Are you physically unfit or on a weight reducing diet?" User says, "No." IMIS asks, "Do you have sex less than 3 times a week, on average?" User says, "Yes." System says, "Infrequent sex may be the cause of your condition," and adding "Here are other leading causes of infertility for people your age: 1) Low-sperm count in the male; 2) Blocked fallopian tubes in the female; and 3) Chronic pelvic infection in female. Further, the system communicates that "it cannot perform a physical exam and cannot diagnose your condition. Only a doctor can diagnose your condition. Would you like more information about these conditions?" User replies, "Yes."

In response, the system outputs or presents a hyperlinked page of condition descriptions, treatments for each condition, success rates for each treatment, specialists in infertility, and infertility support groups. At the top of the page, the system communicates: "If you visit a doctor and are diagnosed, please come back for another visit."

Six months later, the user logs on to the system. The system recognizing the username and its associated case number, communicates: "Welcome back. Can I ask the status of your situation with infertility?" User replies, "Yes, my wife and I are now pregnant." System says, "Congratulations! Did you visit a doctor to be diagnosed? User says, "Yes, the doctor performed tests on both me and my wife. No obvious problem was found; he recommended that we buy a basal thermometer and use it. After two months, we got pregnant." System says "Where did you buy your basal thermometer?" User says, "On the web, from drugstore.com."

The system says, "Thank you for your input. I'll add your comments about basal thermometers to my database. Your input may help other couples that are having problems with fertility. Is there anything else I can help you with today?" User says, "No, that's all for now." The system says, "Thanks again for your help. I'm going to e-mail you free coupons for baby formula and diapers. Visit me again if you need info about child care."

CONCLUSION

In furtherance of the art, the inventor has presented systems, methods, and related software for encouraging and managing growth of databases, particularly theme-oriented databases. One exemplary method entails establishing a health-oriented database and granting users access rights to the database based on their contributions or submissions to the database. The exemplary method scores the contributions for quality and/or relevance, granting access rights based on the scores to contributors. Other embodiments record the queries of users of the database and facilitate communications between users having similar queries. Thus, the exemplary method and related systems and software facilitate not only organized growth of a theme-oriented database, but also developing relationships between users of the database.

The embodiments described above are intended only to illustrate and teach one or more ways of practicing or implementing the present invention, not to restrict its breadth or scope. The actual scope of the invention, which embraces all ways of practicing or implementing the concepts of the invention, is defined only by the following claims and their equivalents.

The invention claimed is:

1. A system comprising:
   a plurality of user access stations;
   a first database having content;
   a second database storing data representative of respective rights of users to access the first database via a browser-equipped user access station;
   a server for providing users of one or more of the user access stations access to the first database via a network, wherein the server is configured to:
   receive a user data contribution from a user via one of the user access stations for addition to the content of the first database so that the contribution can be accessed by users of browser-equipped access stations;
   automatically evaluate at least a portion of the received user data contribution relative to at least a portion of the content of the first database; and
   automatically update the data representative of respective rights of the user to access the first database based on results of the automatic evaluation.

2. The system of claim 1, wherein the server is additionally configured to add at least a portion of the received user data contribution to the content of the first database in response to the automatic evaluation being positive.

3. The system of claim 1, wherein to automatically evaluate at least a portion of the received user data contribution relative to the content of the first database, the server is configured to compare at least the portion of the received user data contribution to content of the first database.

4. The system of claim 1
   wherein to automatically evaluate at least a portion of the received user data contribution relative to content of the first database, the server is configured to automatically define a query based on the user contribution, to search content of the first database based on the query, and to determine a score based on results of the search; and
   wherein to automatically update the data representative of respective rights of the user to access the first database based on results of the automatic evaluation, the server is configured to update the data representative of respective access rights based on the determined score.

5. The system of claim 1, wherein the server is further configured to automatically increase a quantity in the second database representative of the respective rights of the user to access the first database based on the automatic evaluation being positive, thereby increasing access fights of the user and providing incentive for additional contributions.

6. The system of claim 1, wherein the server is further configured to receive a query for data in the first database from a user of the one browser-equipped user access stations and to provide query results based on the received query and automatically updated access rights of the user.

7. The system of claim 6, wherein to provide query results based on the accepted query and automatically updated access rights of the user, the server is configured to exclude access of the user to one or more portions of the query results based on the updated access rights.

8. The system of claim 6
   wherein the second database includes previously submitted queries, with each query logically associated with contact information for a respective user; and
   wherein the server is further configured to output at least a portion of the contact information for at least one respective user to the one access station used by the user who submitted the query in response to a determination that the received query is similar to a previously submitted query logically associated wit the one respective user.

9. The system of claim 1, wherein the server is further configured to request user login data via the user access stations and to request and accept user data contributions descriptive of third parties.

10. The system of claim 9, wherein the server is further configured to request user data contributions that are descriptive of a user's experience with a provider of medical service.

11. The system of claim 1, wherein the server comprises:
    means for accessing data representative of respective rights of a plurality of users to access content of a first database;
    means for receiving a user data contribution from one or more of the users for addition to the content of the first database so that the contribution can be accessed by at least one or more other users via the server;
    means for automatically evaluating at least a portion of the received user data contribution relative to at least a portion of the content of the first database; and
    means for automatically updating the data representative of respective rights of the user to access the first database to indicate an increase in access rights, based on results of the automatic evaluation.

12. The system of claim 1, wherein to automatically evaluate at least a portion of the received user data contribution relative to the content of the first database, the server is configured to automatically evaluate relevance of the received user data contribution to content of the first database.

* * * * *

UNITED STATES PATENT AND TRADEMARK OFFICE
CERTIFICATE OF CORRECTION

| | | |
|---|---|---|
| PATENT NO. | : 7,162,508 B2 | Page 1 of 1 |
| APPLICATION NO. | : 10/103536 | |
| DATED | : January 9, 2007 | |
| INVENTOR(S) | : Messina | |

It is certified that error appears in the above-identified patent and that said Letters Patent is hereby corrected as shown below:

In column 11, line 6, in Claim 1, delete "fights" and insert -- rights --, therefor.

In column 11, line 31, in Claim 4, after "claim 1" insert -- : --.

In column 11, line 47, in Claim 5, delete "fights" and insert -- rights --, therefor.

In column 12, line 9, in Claim 8, after "claim 6" insert -- : --.

In column 12, line 18, in Claim 8, delete "wit" and insert -- with --, therefor.

Signed and Sealed this

Twenty-fourth Day of June, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,162,508 B2 | |
| APPLICATION NO. | : 10/103536 | |
| DATED | : January 9, 2007 | |
| INVENTOR(S) | : Christopher P. Messina | |

It is certified that error appears in the above-identified patent and that said Letters Patent is hereby corrected as shown below:

In column 1, line 11, delete "is a continuation of" and insert --claims priority to--, therefor.

Signed and Sealed this
Sixteenth Day of October, 2012

David J. Kappos
*Director of the United States Patent and Trademark Office*